US009943185B2

(12) United States Patent
Chen

(10) Patent No.: US 9,943,185 B2
(45) Date of Patent: Apr. 17, 2018

(54) KETTLE HAVING CAPABILITY OF PREVENTING OVERFLOW OF BOILED WATER

(71) Applicant: Kuo-Chang Chen, Tainan (TW)

(72) Inventor: Kuo-Chang Chen, Tainan (TW)

(*) Notice: Subject to any disclaimer, the term of this patent is extended or adjusted under 35 U.S.C. 154(b) by 11 days.

(21) Appl. No.: 15/296,631

(22) Filed: Oct. 18, 2016

(65) Prior Publication Data

US 2017/0105568 A1  Apr. 20, 2017

(30) Foreign Application Priority Data

Oct. 20, 2015  (TW) .............................. 104216797 U

(51) Int. Cl.
| | |
|---|---|
| *A47J 27/21* | (2006.01) |
| *A47G 19/14* | (2006.01) |
| *A47G 19/12* | (2006.01) |
| *B65D 47/06* | (2006.01) |

(52) U.S. Cl.
CPC ......... *A47J 27/21191* (2013.01); *A47G 19/12* (2013.01); *A47G 19/14* (2013.01); *A47J 27/21* (2013.01); *A47J 27/21058* (2013.01); *A47J 27/21158* (2013.01); *A47J 27/21175* (2013.01); *B65D 47/06* (2013.01)

(58) Field of Classification Search
CPC  A47J 27/21191; A47J 27/21175; A47J 27/21; A47J 27/21058; A47J 27/21158; A47G 19/14; A47G 19/12; B65D 47/06

See application file for complete search history.

(56) References Cited

U.S. PATENT DOCUMENTS

| | | | | |
|---|---|---|---|---|
| 1,702,243 | A * | 2/1929 | Axtell | A47G 19/14 99/295 |
| 3,939,550 | A * | 2/1976 | Winslow | A47G 19/14 29/458 |
| 4,526,797 | A * | 7/1985 | Stone, Jr. | A47G 19/14 220/256.1 |
| 4,721,214 | A * | 1/1988 | Wandel | A47G 19/127 215/13.1 |
| 4,750,644 | A * | 6/1988 | Kolody | A47G 19/12 222/144.5 |
| 2002/0179637 | A1* | 12/2002 | Doron | A47J 27/21175 222/108 |

(Continued)

FOREIGN PATENT DOCUMENTS

GB        2238949 A  *  6/1991  ........ A47J 27/21191

*Primary Examiner* — Frederick C Nicolas
(74) *Attorney, Agent, or Firm* — Birch, Stewart, Kolasch & Birch, LLP

(57) ABSTRACT

A kettle has a container and a guiding board. The container has a body. The body has an upper segment, a lower segment, and a through hole defined in the lower segment and having a top edge and a bottom edge. The guiding board is attached securely to an inner surface of the lower segment of the body, covers the through hole, and has a guiding segment. The guiding segment is attached securely to the inner surface of the lower segment of the body at a position below the bottom edge of the through hole, is curved in cross section, extends upward and toward the central line of the body, is free from forming a through bore, and has a top edge higher than the bottom edge of the through hole and lower than the top edge of the through hole.

20 Claims, 10 Drawing Sheets

(56) References Cited

U.S. PATENT DOCUMENTS

2005/0045671 A1* 3/2005 Beesley ............... A47J 43/046
                                                    222/559
2010/0270284 A1* 10/2010 Cohen ............... A47J 27/21175
                                                    219/429
2012/0091119 A1* 4/2012 Lim .................. A47J 27/21016
                                                    219/431

* cited by examiner

KETTLE HAVING CAPABILITY OF PREVENTING OVERFLOW OF BOILED WATER

BACKGROUND OF THE INVENTION

1. Field of the Invention

The present invention relates to a kettle, and more particularly to a kettle having a capability of preventing overflow of boiled water.

2. Description of Related Art

A kettle can be applied to boiling water and comprises a container and a lid. The container has a body, a spout, and a handle. The spout is connected to the body at a position adjacent to the bottom of the body. The handle is mounted on the body at a position opposite the spout. The body further has a through hole communicating with the spout, and the body may further have a board attached to the inner surface of the body to cover the through hole. The board comprises at least one through bore defined through the board and communicates with the through hole. The lid is attached to the top of the body to cover a top opening of the body.

In use, water is poured into the body via the top opening, and the kettle is put above a heat source for boiling the water. Because the water near the bottom of the body is close to the heat source, bubbles are formed in the water near the bottom of the body. The bubbles may enter the spout through the through bores in the board and the through hole in the body, and thus the water level in the spout will be raised. Therefore, the water in the spout easily overflows from the spout.

To overcome the shortcomings, the present invention tends to provide a kettle to mitigate or obviate the aforementioned problems.

SUMMARY OF THE INVENTION

The main objective of the invention is to provide a kettle that has a capability of preventing overflow of boiled water.

The kettle has a pot, a guiding board, and a lid. The container has a body and a spout. The body has an upper segment, a lower segment, a top opening defined through a top of the body, and a through hole defined in the lower segment and having a center, a top edge, and a bottom edge. The spout is connected with the lower segment of the body and communicates with the through hole. The guiding board is attached securely to an inner surface of the lower segment of the body, covers the through hole, and has a guiding segment. The guiding segment is attached securely to the inner surface of the lower segment of the body at a position below the bottom edge of the through hole, is curved in cross section, extends upward and toward the central line of the body, is free from forming a through bore, and has a top edge higher than the bottom edge of the through hole and lower than the top edge of the through hole. The lid is mounted detachably on the top of the body to cover the top opening.

Other objects, advantages and novel features of the invention will become more apparent from the following detailed description when taken in conjunction with the accompanying drawings.

DETAILED DESCRIPTION OF PREFERRED EMBODIMENT

Figure 1:
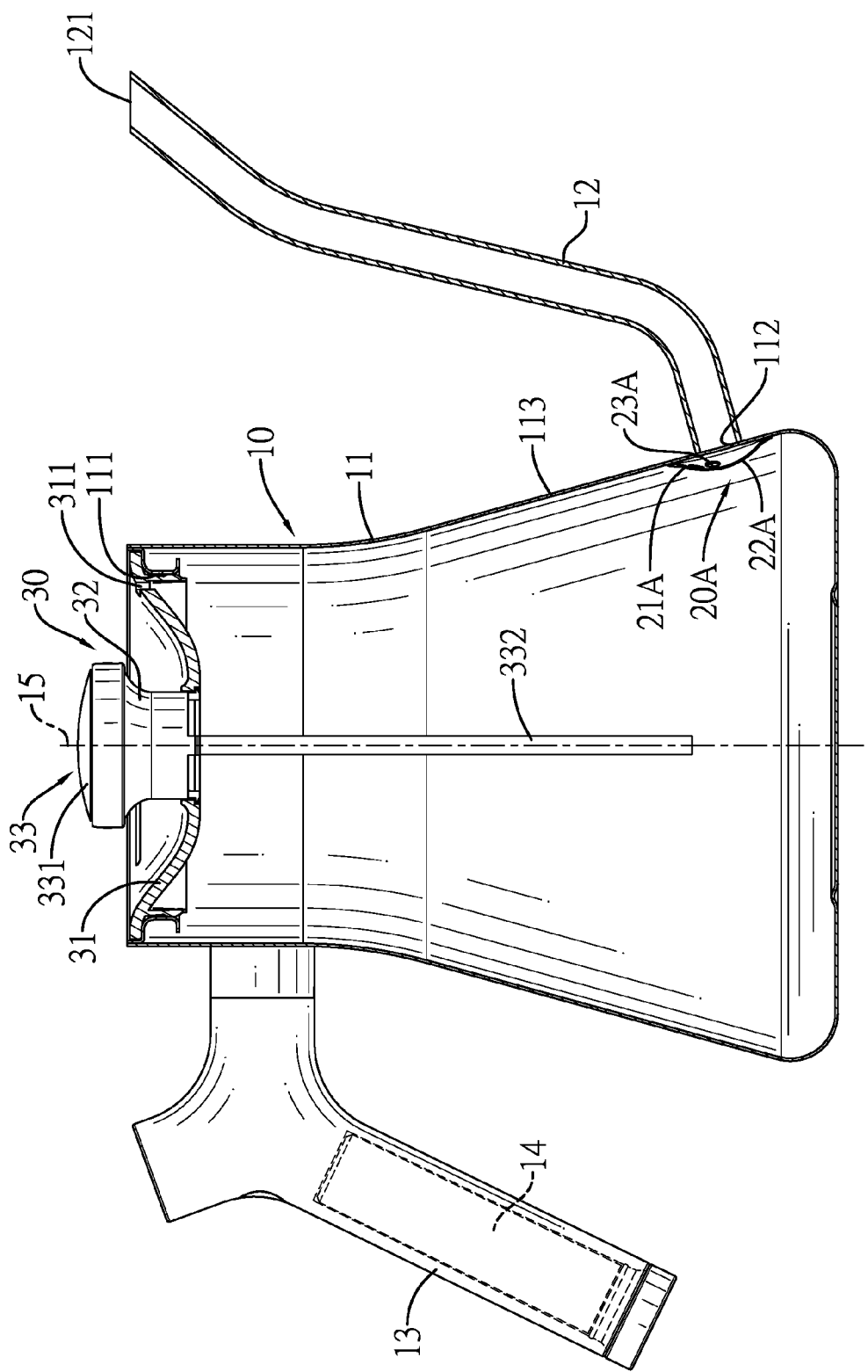
FIG. 1 is a side view in partial section of a first embodiment of a kettle in accordance with the present invention.
Figure 2:
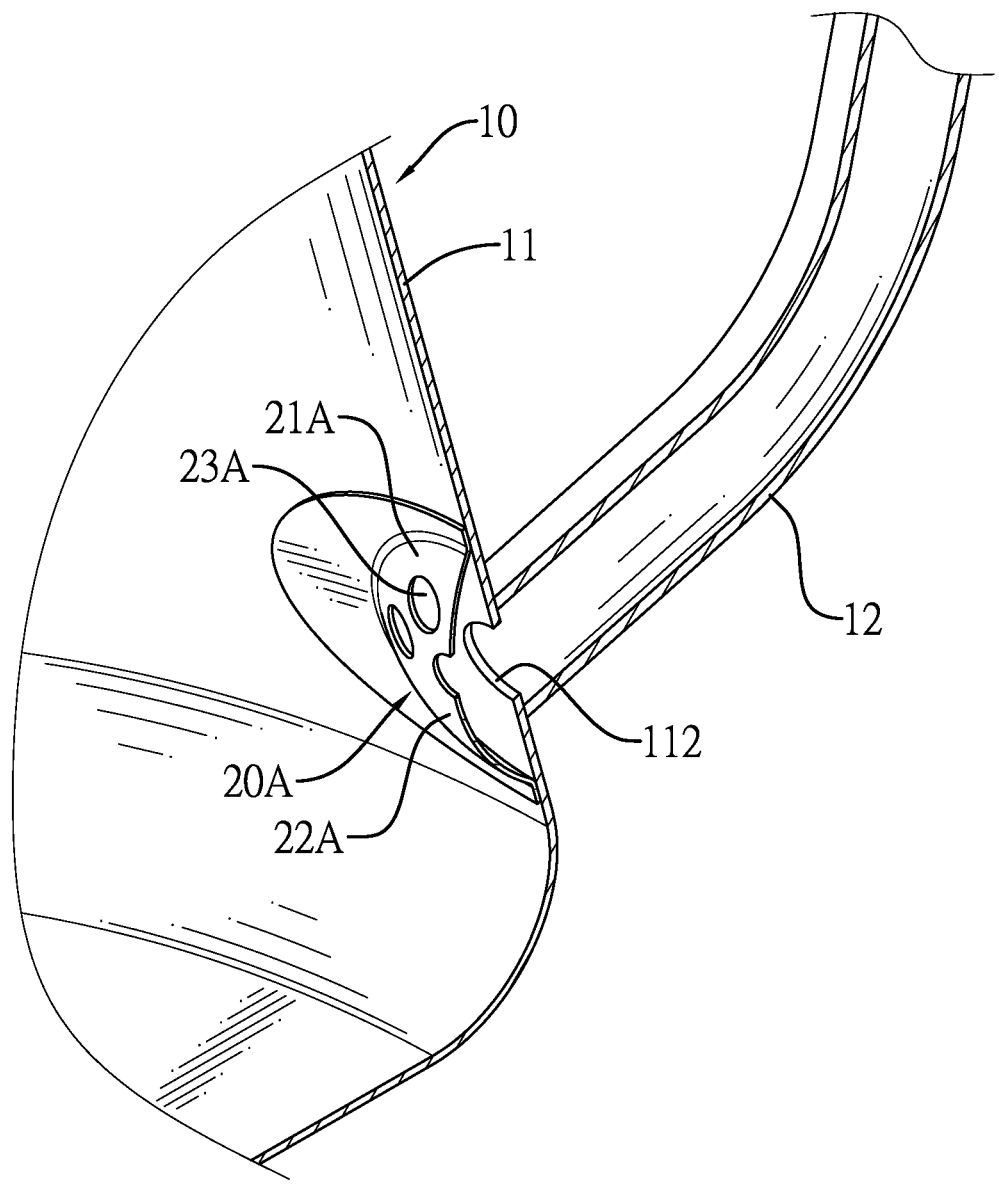
FIG. 2 is an enlarged perspective view in partial section of the kettle in FIG. 1.
Figure 3:
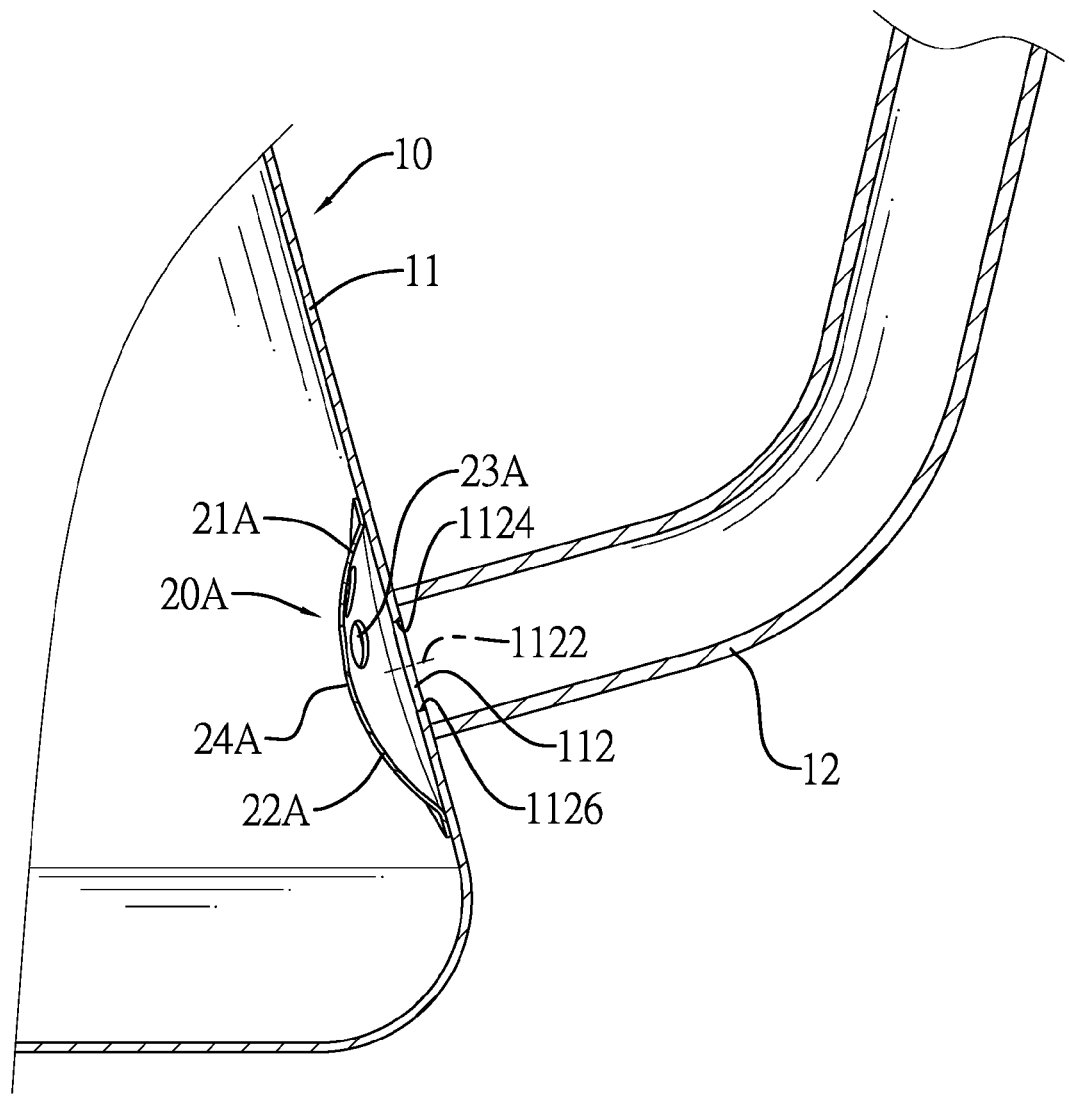
FIG. 3 is an enlarged cross sectional side view of the kettle in FIG. 1.

With reference to FIGS. 1 to 3, a first embodiment of a kettle in accordance with the present invention comprises a container 10, a guiding board 20A, and a lid 30. The container 10 comprises a body 11, a spout 12, and a handle 13. The body 11 has a central line 15, an upper segment, a lower segment, a top opening 111, and a through hole 112. Preferably, the lower segment may be conical and has a diameter gradually increasing from a top to a bottom of the lower segment. The top opening 111 is defined through a top of the body 11. The through hole 112 is defined in the lower segment and has a center 1122, a top edge 1124, and a bottom edge 1126. The spout 12 is connected with the lower segment of the body 11 and communicates with the through hole 112. The handle 13 is attached to the body 11 at a side opposite the spout 12. The handle 13 may be made of plastic or wood. In addition, the handle 13 further has a weight 14 mounted in the handle 13 to increase the stability of using the kettle.

The guiding board 20A is attached securely to an inner surface of the lower segment of the body 11 and covers the through hole 112. In the first embodiment, the guiding board 20A completely covers the through hole 112 and comprises a guiding segment 22A and a communicating segment 21A. The guiding segment 22A is attached securely to the inner surface of the lower segment of the body 11 at a position below the bottom edge 1126 of the through hole 112, is curved in cross section, extends upward and toward the central line 15 of the body 11, and is free from forming a through bore. The guiding segment 22A has a top edge 24A higher than the bottom edge 1126 of the through hole 112 and lower than the top edge 1124 of the through hole 112. The communicating segment 21A is connected with the top edge 24A of the guiding segment 22A, extends upward and away from the central line 15 of the body 11, and is curved in cross section. The communicating segment 21A has a top edge and at least one through bore 23A defined through the communicating segment 21A and communicating with the through hole 112 in the body 11. The top edge of the communicating segment 21A is attached securely to the inner surface of the lower segment of the body 11 at a position above the top edge 1124 of the through hole 112.

With reference to FIGS. 1 and 3, as the shape of the lower segment of the body 11 is conical instead of cylindrical, the guiding segment 22A extends more toward the central line 15 of the body 11.

The lid 30 is mounted detachably on the top of the body 11 to cover the top opening 111 and comprises a lid cover 31, a grip 32, at least one vent 311, and a temperature meter assembly 33. The lid cover 31 is attached to the top of the body 11 to cover the top opening 111. The grip 32 is mounted on the lid cover 31 and has a top. The at least one vent 311 is defined through the lid cover 31. The temperature meter assembly 33 is mounted on the lid 30 and comprises a display 331 and a temperature probe 332. The display 331 is mounted on the grip 32 and is exposed from the top of the grip 32. The temperature probe 332 is connected electrically with the display 331 and extends into the body 11 to detect the temperature of water in the body 11. The display 331 is applied to show the temperature to the user.

Figure 4:
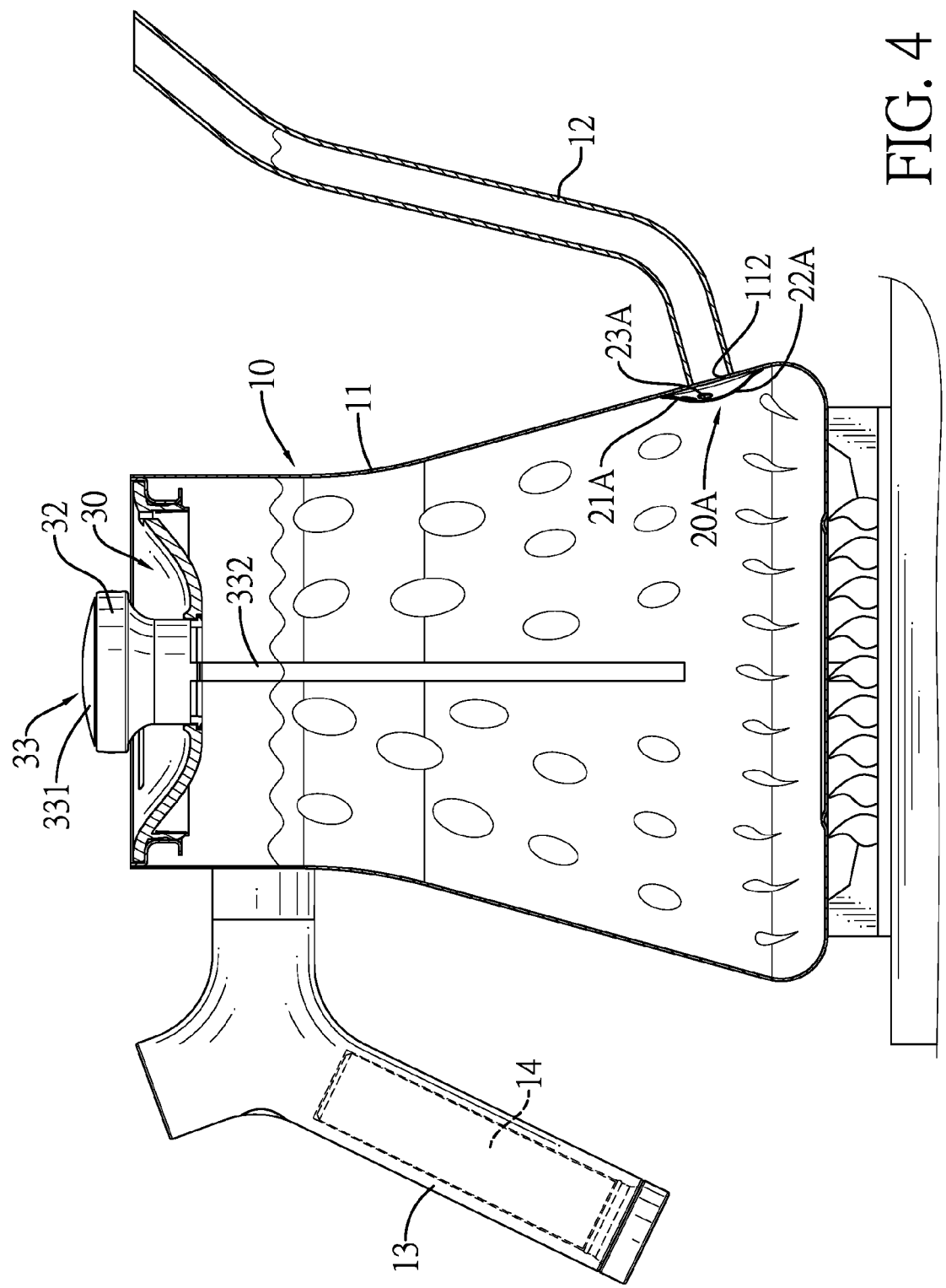
FIG. 4 is an operational side view in partial section of the kettle in FIG. 1.
Figure 5:
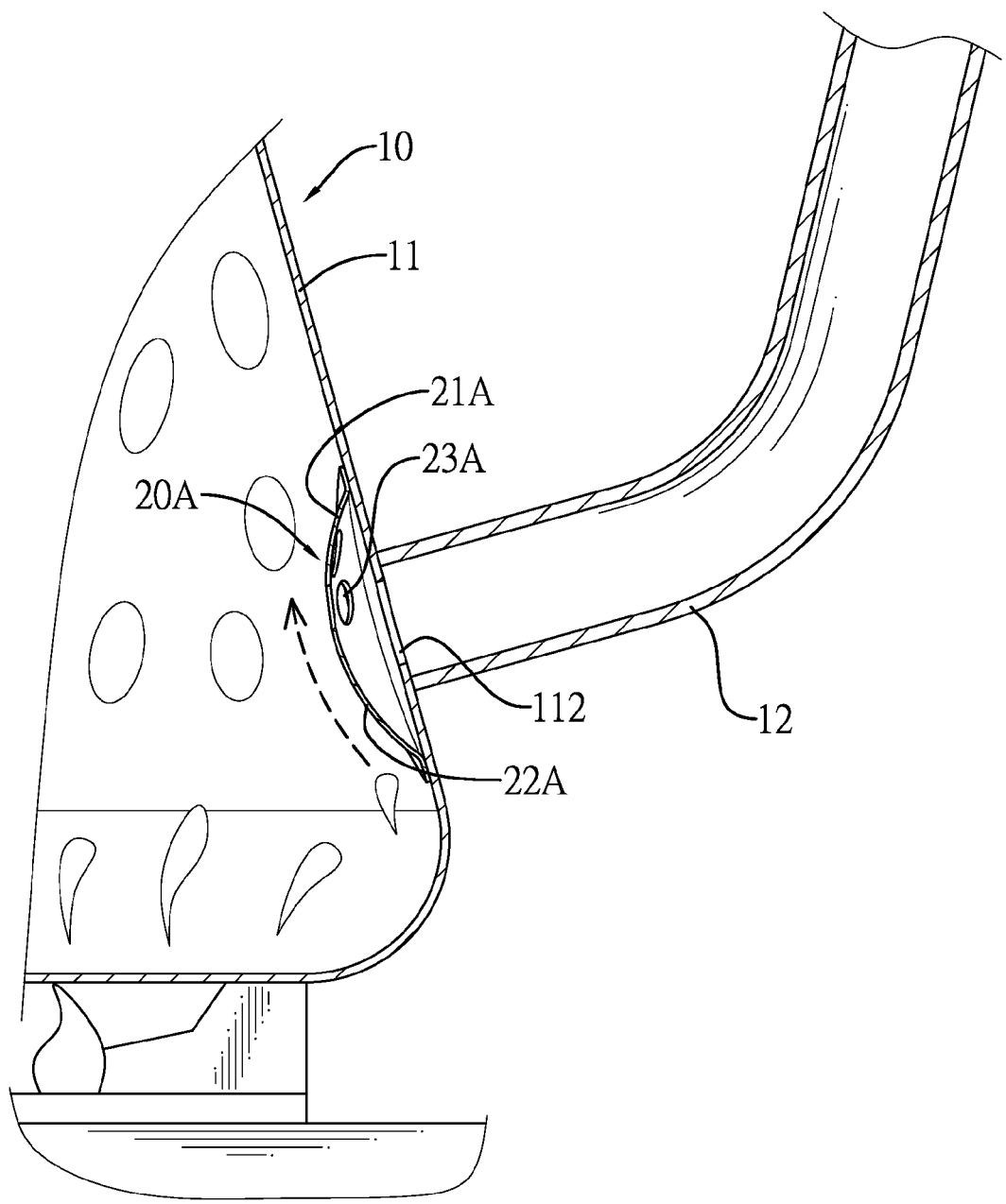
FIG. 5 is an enlarged operational cross sectional side view of the kettle in FIG. 1.

With reference to FIGS. 1, 4 and 5, in use, when the kettle is applied to boil water, the water near the bottom of the body 11 is close to the heat source and will generate bubbles. Because the guiding segment 22A of the guiding board 20A extends upward and toward the central line 15 of the body 11 of the container 10 and does not have any through bore, the bubbles will be led to be away from and is kept from entering the through hole 112. Accordingly, the water in the spout 12 can be prevented from overflowing from the spout 12 while the water is boiling.

With the through bores 23A in the communicating segment 21A of the guiding board 20A, the water in the body 11 can be poured out from the spout 12 via the through bores 23A in the guiding board 20A and the through hole 112 in the body 11.

Figure 6:
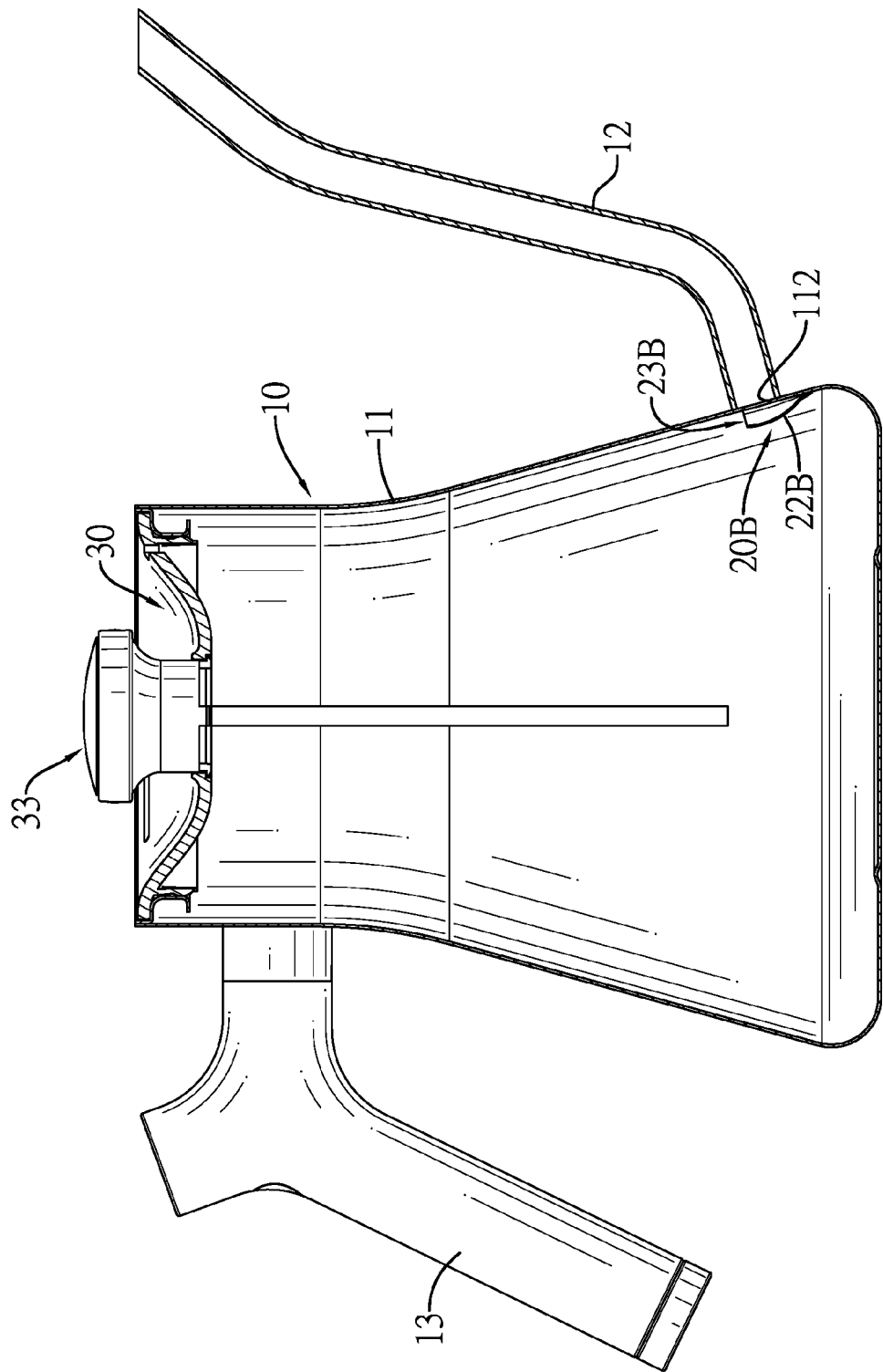
FIG. 6 is a side view in partial section of a second embodiment of a kettle in accordance with the present invention.
Figure 7:
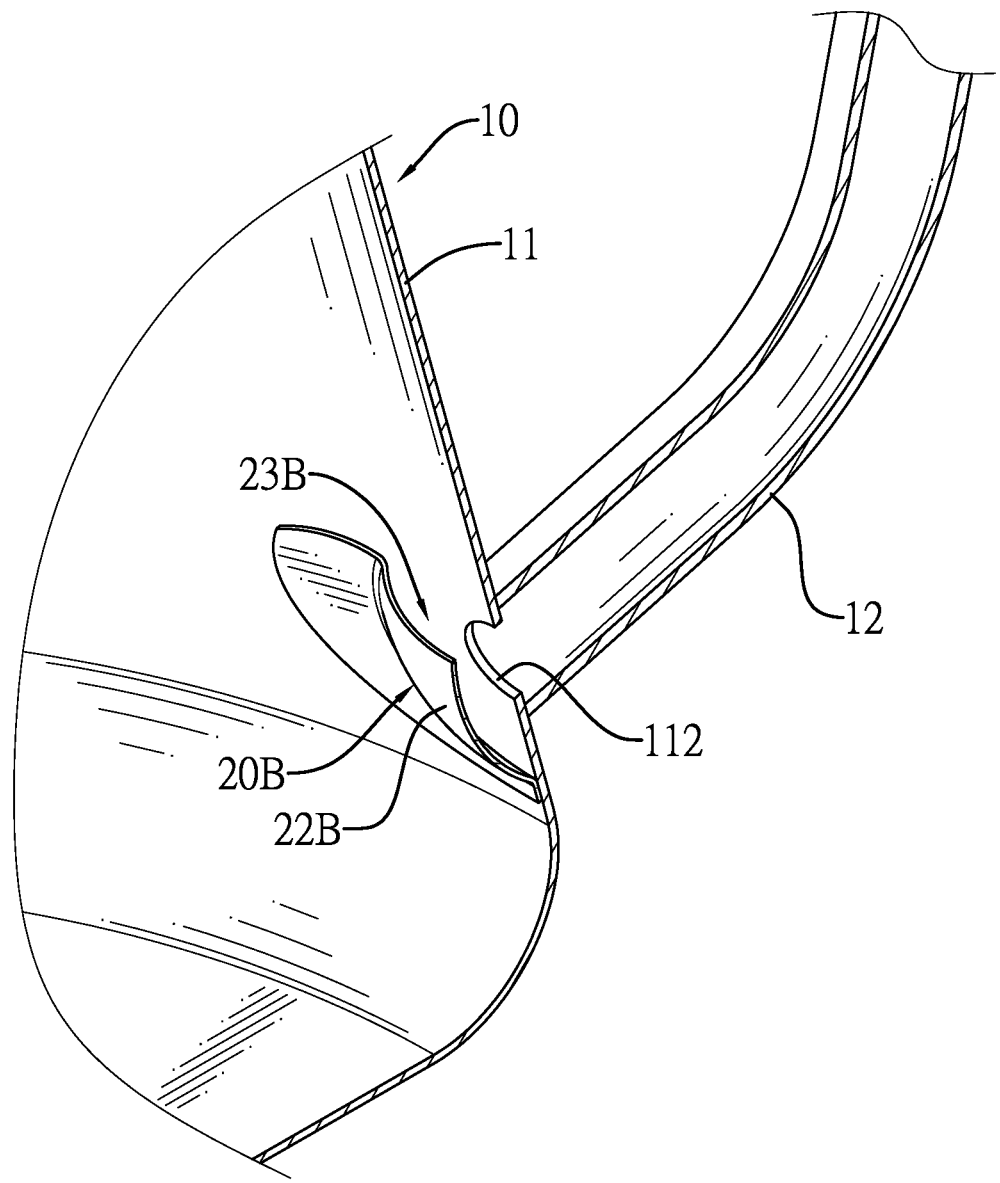
FIG. 7 is an enlarged perspective view in partial section of the kettle in FIG. 6.
Figure 8:
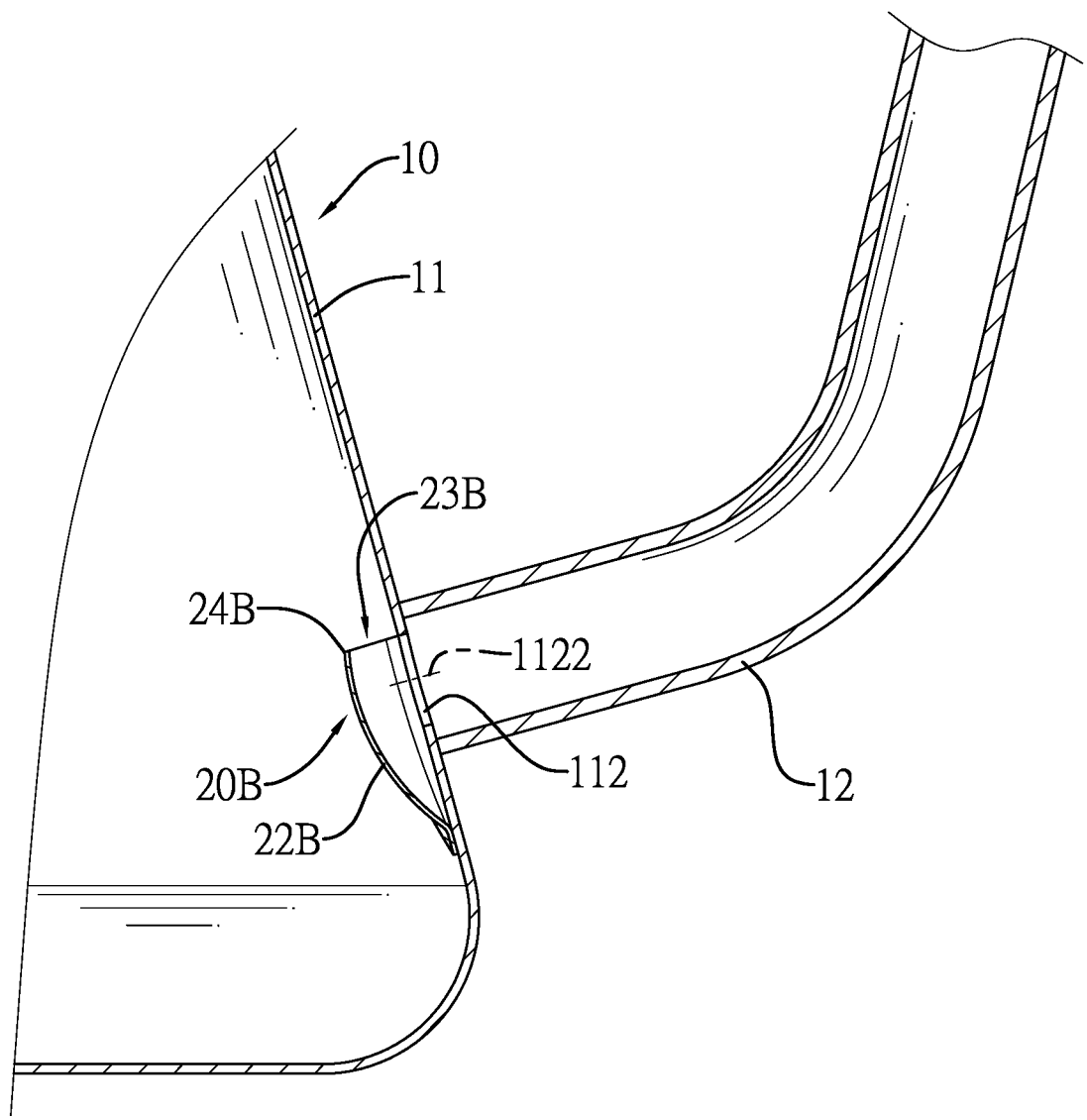
FIG. 8 is an enlarged cross sectional side view of the kettle in FIG. 6.

With reference to FIGS. 6 to 8, in the second embodiment, the guiding board 20B partially covers the through hole 112 and further has a passage 23B defined between the top edge 24B of the guiding segment 22B and the inner surface of the lower segment of the body 11 and communicating with the through hole 112 in the body 11. The top edge 24B of the guiding segment 22B is higher than the center 1122 of the through hole 112.

Figure 9:
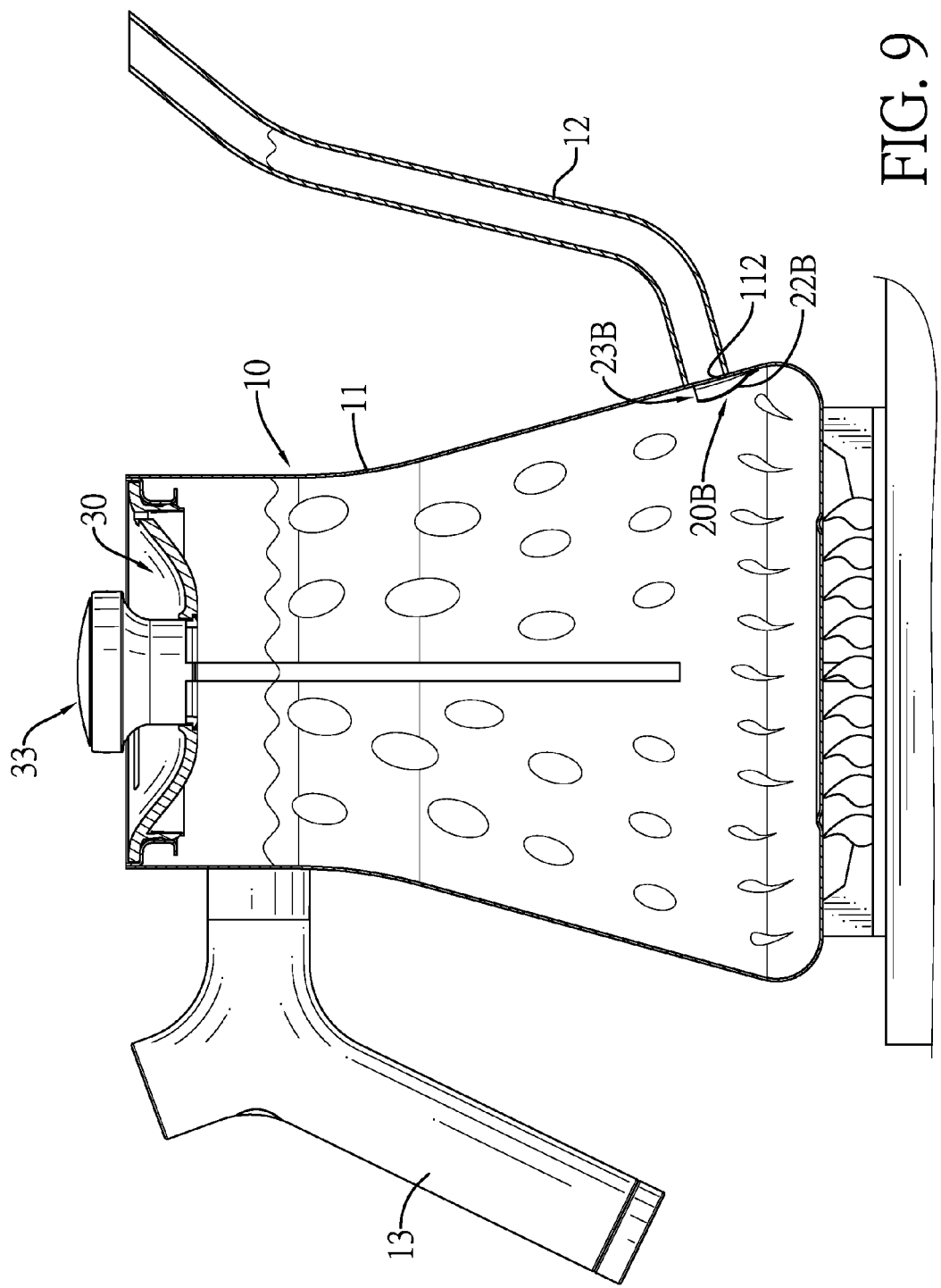
FIG. 9 is an operational side view in partial section of the kettle in FIG. 6.
Figure 10:
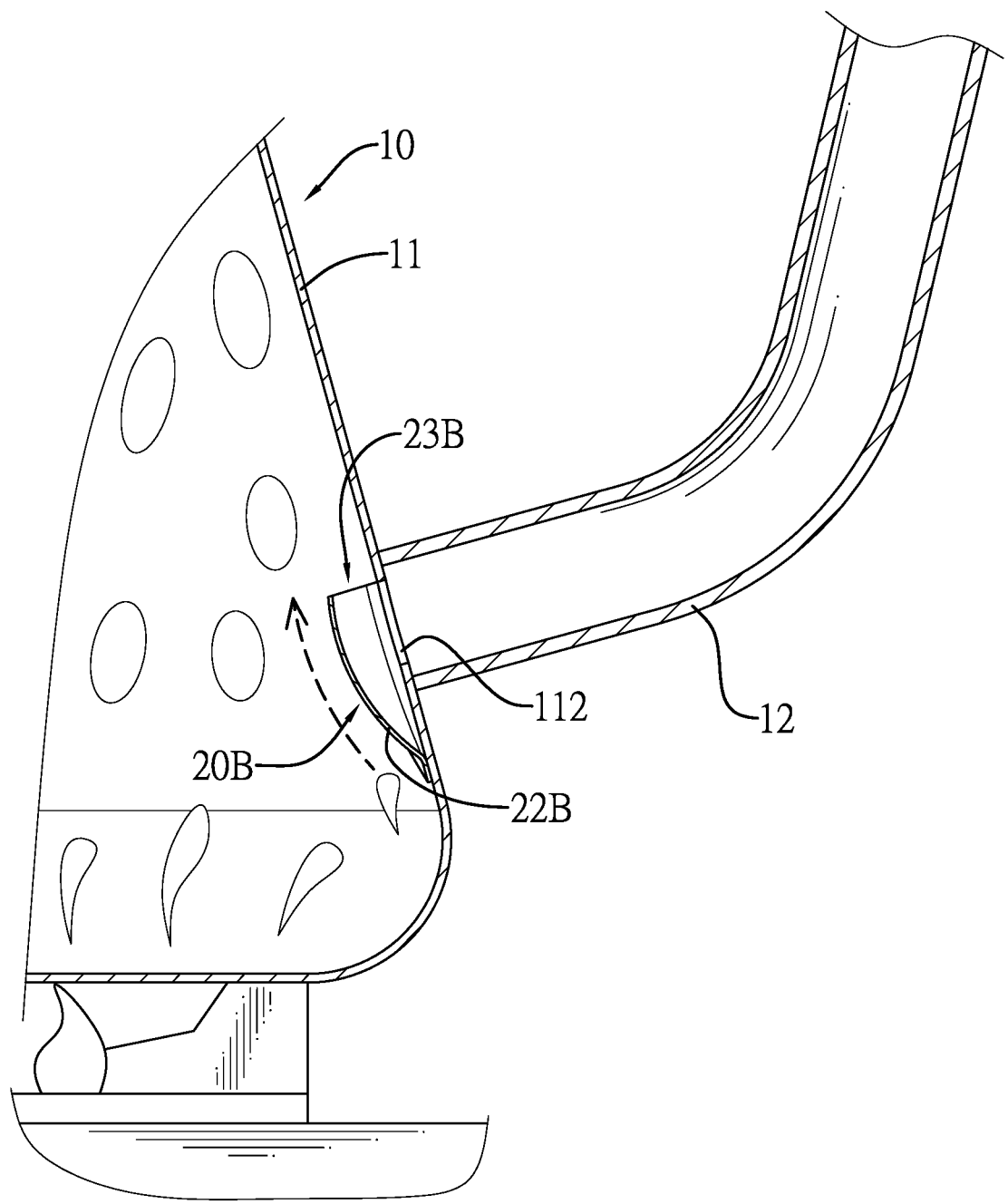
FIG. 10 is an enlarged operational cross sectional side view of the kettle in FIG. 6.

With reference to FIGS. 9 and 10, when the water in the body 11 is boiled, the bubbles generated in the water are led to be away from and are kept from entering the through hole 112 by the guiding segment 22B of the guiding board 20B. Accordingly, the water in the spout 12 can be prevented from overflowing from the spout 12 while the water is boiling. In addition, the water in the body 11 can be poured out from the spout 12 via the passage 23B and the through hole 112 in the body 11.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A kettle comprising:
   a container comprising
      a body having an upper segment, a lower segment, a top opening defined through a top of the body, and a through hole defined in the lower segment and having a center, a top edge, and a bottom edge; and
      a spout connected with the lower segment of the body and communicating with the through hole;
      a guiding board attached securely to an inner surface of the lower segment of the body, covering the through hole, and comprising
         a guiding segment attached securely to the inner surface of the lower segment of the body at a position below the bottom edge of the through hole, being curved in cross section, extending upward and toward a central line of the body, being free from forming a through bore, and having a top edge higher than the bottom edge of the through hole and lower than the top edge of the through hole; and
   a lid mounted detachably on the top of the body to cover the top opening.

2. The kettle as claimed in claim 1, wherein the guiding board completely covers the through hole and further has a communicating segment connected with the top edge of the guiding segment extending upward and away from the central line of the body, being curved in cross section, and having
   a top edge attached securely to the inner surface of the lower segment of the body at a position above the top edge of the through hole; and
   at least one through bore defined through the communicating segment and communicating with the through hole in the body.

3. The kettle as claimed in claim 2, wherein the lid comprises
   a lid cover attached to the top of the body to cover the top opening; and
   a grip mounted on the lid cover and having a top; and
   a temperature meter assembly mounted on the lid and comprising
      a display mounted on the grip and exposed from the top of the grip; and
      a temperature probe connected electrically with the display and extending into the body.

4. The kettle as claimed in claim 3, wherein the lower segment of the body is conical and has a diameter gradually increasing from a top to a bottom of the lower segment.

5. The kettle as claimed in claim 4, wherein the body of the container further comprises a handle attached to the body at a side opposite the spout.

6. The kettle as claimed in claim 5, wherein the handle further has a weight mounted in the handle.

7. The kettle as claimed in claim 6, wherein the lid has at least one vent defined through the lid cover.

8. The kettle as claimed in claim 3, wherein the lid has at least one vent defined through the lid cover.

9. The kettle as claimed in claim 2, wherein the lower segment of the body is conical and has a diameter gradually increasing from a top to a bottom of the lower segment.

10. The kettle as claimed in claim 1, wherein the guiding board partially covers the through hole;
    the top edge of the guiding segment is higher than the center of the through hole; and
    the guiding board further has a passage defined between the top edge of the guiding segment and the inner surface of the lower segment of the body and communicating with the through hole in the body.

11. The kettle as claimed in claim 10, wherein the lid comprises
    a lid cover attached to the top of the body to cover the top opening; and
    a grip mounted on the lid cover and having a top; and
    a temperature meter assembly mounted on the lid and comprising
       a display mounted on the grip and exposed from the top of the grip; and
       a temperature probe connected electrically with the display and extending into the body.

12. The kettle as claimed in claim 11, wherein the lower segment of the body is conical and has a diameter gradually increasing from a top to a bottom of the lower segment.

13. The kettle as claimed in claim 12, wherein the body of the container further comprises a handle attached to the body at a side opposite the spout.

14. The kettle as claimed in claim 13, wherein the handle further has a weight mounted in the handle.

15. The kettle as claimed in claim 14, wherein the lid has at least one vent defined through the lid cover.

16. The kettle as claimed in claim 11, wherein the lid has at least one vent defined through the lid cover.

17. The kettle as claimed in claim 10, wherein the lower segment of the body is conical and has a diameter gradually increasing from a top to a bottom of the lower segment.

18. The kettle as claimed in claim 1, wherein the lower segment of the body is conical and has a diameter gradually increasing from a top to a bottom of the lower segment.

19. The kettle as claimed in claim 1, wherein the body of the container further comprises a handle attached to the body at a side opposite the spout.

20. The kettle as claimed in claim 19, wherein the handle further has a weight mounted in the handle.

\* \* \* \* \*